July 16, 1963  G. LOOPER  3,097,879
VEHICLE BODY
Filed Oct. 25, 1961
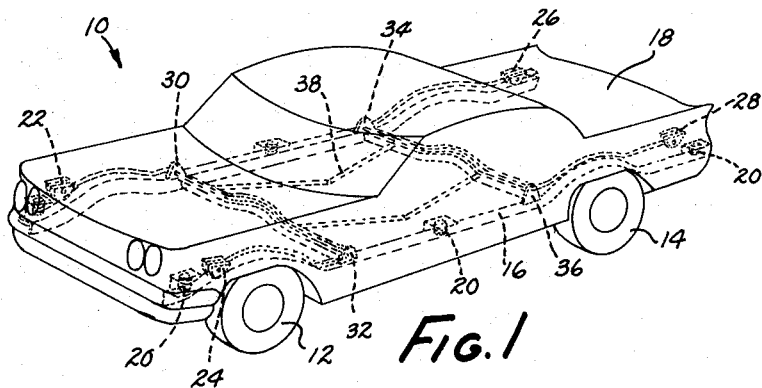
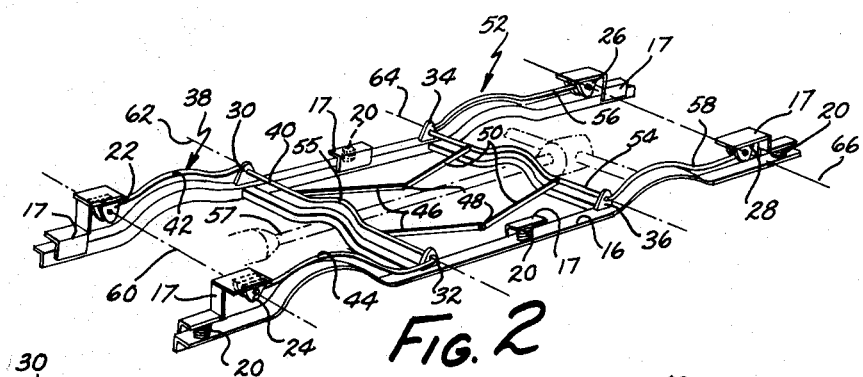
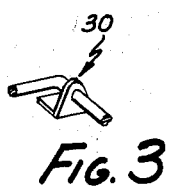
FIG. 3
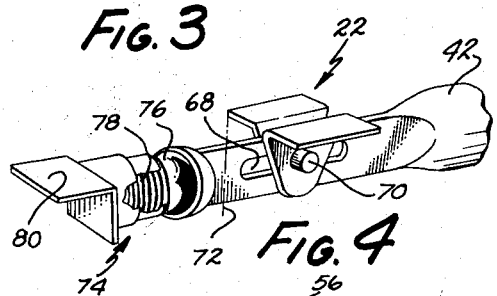
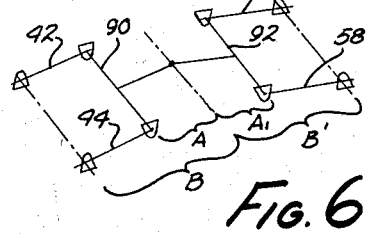
FIG. 6
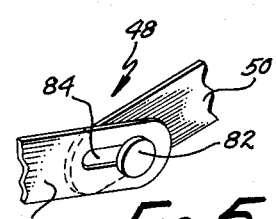
FIG. 5
FIG. 7
INVENTOR.
GLENN LOOPER
BY
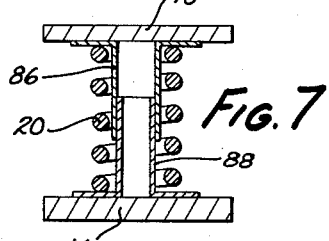
ATTORNEYS

United States Patent Office 3,097,879
Patented July 16, 1963

3,097,879
VEHICLE BODY
Glenn Looper, 508 S. Thornton Ave., Dalton, Ga.
Filed Oct. 25, 1961, Ser. No. 147,625
8 Claims. (Cl. 296—35)

This invention relates to vehicles, and more particularly to vehicles having a body which remains level regardless of the load applied thereto or the point of its application.

Generally, vehicles are constructed by resiliently supporting a chassis or frame on an adequate number of wheels, and rigidly affixing a body to the chassis. When such a vehicle is loaded more heavily on one side than another, the body and chassis are inclined to tilt sideways and to load the wheels unevenly. In addition to the resulting discomfort, the resulting uneven wear of the tires and vehicle structure have made it desirable to build a body which remains level regardless of the point of application of load thereto. Torsion bars and other devices have previously been proposed for solving the tilting problem, but none so far have proved particularly effective.

The present invention solves this problem by providing a vehicle construction in which the body is resiliently mounted to the chassis or frame, and is also connected thereto by a linkage system which maintains the body level at all times. Thus, if a load is applied to one side or one corner of the body, the entire body descends on its resilient mountings while remaining level, much like an elevator.

It is therefore the object of this invention to provide a vehicle body which is resiliently vertically movable with respect to the chassis but remains parallel thereto regardless of the amount of load applied thereto. This and other objects will be apparent from the following specification, taken in connection with the attached drawings in which:

FIG. 1 is a perspective view of a car constructed according to this invention;

FIG. 2 is a perspective view showing the chassis of the car of FIG. 1 and the linkage suspension for the body;

FIG. 3 is a perspective detail view of one type of pivot used in this invention;

FIG. 4 is a fragmentary perspective view showing another type of pivot used in this invention, also showing one possible means for centering the body;

FIG. 5 is a perspective view of the floating pivot of this invention;

FIG. 6 is a schematic diagram showing another possible linkage system adapted to carry out the principles of this invention; and FIG. 7 is a vertical cross section showing the detail of another means for preventing horizontal movement of the body.

The invention teaches the floating suspension of the vehicle body on the frame or chassis by means of springs or other appropriate suspension means. "Body," as used herein, should be understood to refer either to the entire superstructure of a vehicle, or to a part thereof such as the cargo-carrying bed of a truck. Spaced pivots are provided on both the chassis and the body and are interconnected by a system of linkages so designed that when a load is applied to one part of the body, the linkages transmit this load to the other parts of the body in such a manner as to pull down all four corners of the body simultaneously in response to the application of a load to one of them.

Referring now to the drawings, FIG. 1 shows at 10 a car constructed according to this invention. Resiliently mounted wheels 12 and 14 support a chassis 16 between them. A body 18 is supported on the chassis 16 by brackets 17 attached to the body 18 in any convenient manner and resting on springs 20. Pivots 22, 24, 26 and 28 are distributed over the lower portion of the body 18. Pivots 30, 32, 34 and 36 are mounted on the chassis 16 in line with and between the pivots 22, 24, 26 and 28. A rigid linkage member 38 having a crossbar 40 and longitudinal pivot arms 42 44 connects the pivots 22, 24 and 30, 32 and carries a pair of central rigid linking arms 46 which are connected to floating pivots 48. Also connected to the floating pivots 48 are the linkage arms 50 of a second rigid linkage member 52 which is also provided with a crossbar 54 and longitudinal pivot arms 56, 58. Pivots 22, 24 are coaxial on axis 60; pivots 30, 32 are coaxial on axis 62; pivots 34, 36 are coaxial on axis 64; and pivots 26, 28 are coaxial on axis 66. It will be understood that the crossbar 54 may be bent as at 55 so as to clear the drive shaft 57.

FIG. 4 shows a detail of any one of pivots 22, 24, 26 or 28. Assuming that the pivot shown is 22, the pivot arm of linkage member 38 associated therewith is 42. The arm 42 is provided with a slot 68, whose length is considerably exaggerated in FIG. 4 for clarity, in which the pivot pin 70 can move lengthwise of arm 42. It is possible for arm 42 to terminate at line 72; but in one form of the invention, the end of arm 42 beyond line 72 carries means for preventing the horizontal movement of body 18 with respect to chassis 16 made possible by the play provided pin 70 in slot 68. The centering means generally designated as 74 comprises a ball joint 76 which transmits the force of a spring 78 to the free end of arm 42. The other end of spring 78 is tied to a bracket 80 fixed in any desired manner to the body 18. It will be understood that similar means 74 are also provided at the free ends of each of the pivot arms 44, 56 and 58. Since each of the springs 78 tends to equalize its compression with that of the other springs 78 as the pivot arms move, the means 74 tends to keep the body centered at any point of its motion.

FIG. 5 shows the floating pivot 48 in detail. Linkage arms 46 and 50 are held together by a pivot pin 82 which can move to a limited degree in slot 84. Like slot 68 in FIG. 4, slot 84 is exaggerated in the drawing as far as its length is concerned. Any convenient means such as an enlarged head on pivot pin 82 may be used to hold linking arms 46 and 50 together.

It will be evident from an examination of the geometry of the linkage described herein that on each of the rigid members 38, two sets of pivots must be sliding (i.e. slotted) while the third is not, as shown in detail for pivot 30 in FIG. 3. For example, slots may be provided at pivots 22, 24 and 48 while pivots 30, 32 are fixed; or pivots 22, 24, 30 and 32 may be slotted while pivots 48 are fixed.

*Alternative Embodiments*

FIG. 6 shows, in schematic form, an alternative embodiment of the linkage system of this invention. In this figure, the upright triangles indicate pivots attached to the chassis; the inverted triangles indicate pivots attached to the body; and the solid dot indicates a floating pivot. It will be seen that many variants of the linkages shown are possible, the criterion always being that at least three pivots must be provided on each of the chassis and body (i.e. a sufficient number of pivots to define a total of two planes). In addition, each rigid linkage member must be pivoted at two axially spaced points on each of the chassis and body if it has only one floating pivot.

It will be readily understood tht in FIG. 6, axle 90 must be keyed to pivot arms 42 and 44, and that axle 92 must be keyed to pivot arms 56, 58.

A further alternative embodiment of this invention is shown in FIG. 7, in which the means 74 are replaced by telescoping members 86, 88 which prevent any relative movement except vertical movement between the chassis 16 and body 18, and which also form a core for springs 20.

*Operation*

The operation of the device of this invention can best be understood from examining FIGS. 1 and 2. If a load is placed, for example, on the corner of body 18 nearest pivot 22 (e.g. the right front seat of car 10), the outward end of arm 42 moves downwardly about pivot 30. Since arms 42 and 44 are connected by the rigid crossbar 40, arm 44 also pivots about pivot 32 and lowers pivot 24. At the same time, linking arms 46 are raised and raise linking arms 50 with them. This in turn causes the linkage member 52 to pivot about pivots 34, 36 and thus lower pivots 26, 28. Thus, application of force at pivot 22 causes a lowering of the entire body 18 and prevents its being tilted. It will be observed that in order for the linkage to operate properly, corresponding pairs of axially spaced pivots must be coaxial, and that the ratio $A/B$ must always be equal to the ratio $A'/B'$ (FIG. 6).

*Summary*

It will be seen that the present invention provides a simple, inexpensive, yet effective way of providing a vehicle body which distributes any load applied thereto evenly to the chassis, regardless of the amount of load applied thereto or the point of application of such load. It will be obvious from the foregoing description that numerous modifications of the present invention are possible without departing from the spirit thereof. Consequently, the embodiments described above are to be taken as illustrative only, and the invention is not intended to be limited except by the scope of the following claims.

I claim:
1. A vehicle comprising a chassis; a body resiliently supported on said chassis; and a linkage connecting at least three spaced points on said body and at least three spaced points on said chassis, said linkage comprising at least one first pivot secured to said body; at least one second pivot secured to said chassis and having an axis spaced from that of said first pivot; a first rigid member connected to said first and second pivots; at least one third pivot secured to said chassis and having an axis spaced from those of said first and second pivots; at least one fourth pivot secured to said body and having an axis spaced from those of said first, second, and third pivots; and a second rigid member connected to said third and fourth pivots; said first and second rigid members being pivotally connected to each other.

2. A vehicle comprising a rigid chassis; a rigid body resiliently supported on said chassis; and a linkage connecting at least four spaced points on said body and at least two spaced points on said chassis, said linkage comprising a pair of coaxial first pivots secured to said body; at least one second pivot secured to said chassis and having an axis parallel to but spaced from that of said first pivots; a first rigid member connected to said first and second pivots; at least one third pivot secured to said chassis and having an axis parallel to but spaced from those of said first and second pivots; at least a pair of coaxial fourth pivots secured to said body and having an axis parallel to but spaced from those of said first, second, and third pivots; and a second rigid member pivotally connected to said third and fourth pivots; said first and second rigid members being connected to each other by at least one floating pivot having an axis parallel to but spaced from those of said first, second, third, and fourth pivots, the ratio of the distance between the axes of said chassis-secured pivot and said floating pivot to the distance between the axes of said body-secured pivots and said chassis-secured pivot being the same for both of said rigid members.

3. A vehicle comprising a chassis; a body resiliently supported on said chassis; and a linkage connecting at least three spaced points on said body and at least two spaced points on said chassis, said linkage comprising a pair of coaxial first pivots secured to said body; at least one second pivot secured to said chassis; a first rigid member pivotally connected to said first and second pivots and slidable with respect to one of them; at least one third pivot secured to said chassis; at least one fourth pivot secured to said body; and a second rigid member pivotally connected to said third and fourth pivots and slidable with respect to one of them; said first and second rigid members being pivotally and slidably connected to each other.

4. A vehicle comprising a chassis; a body resiliently supported on said chassis; and a linkage connecting at least three spaced points on said body and at least two spaced points on said chassis, said linkage comprising a pair of coaxial first pivots secured to said body; at least one second pivot secured to said chassis and having an axis spaced from that of said first pivot; a first rigid member pivotally connected to said first and second pivots; at least one third pivot secured to said chassis and having an axis spaced from those of said first and second pivots; at least one fourth pivot secured to said body and having an axis spaced from those of said first, second, and third pivots; and a second rigid member pivotally connected to said third and fourth pivots; said first and second rigid members being pivotally connected to each other, and means permitting relative movement of said body and chassis only in a direction normal to said body.

5. A vehicle comprising a chassis; a body resiliently supported on said chassis; and a linkage connecting at least three spaced points on said body and at least two spaced points on said chassis, said linkage comprising a pair of coaxial first pivots secured to said body; at least one second pivot secured to said chassis and having an axis spaced from that of said first pivot; a first rigid member pivotally connected to said first and second pivots; at least one third pivot secured to said chassis and having an axis spaced from those of said first and second pivots; at least one fourth pivot secured to said body and having an axis spaced from those of said first, second, and third pivots; and a second rigid member pivotally connected to said third and fourth pivots; said first and second rigid members being pivotally connected to each other, and means permitting relative movement of said body and chassis only in a direction normal to said body, said last-named means including spring means acting on said rigid members to keep them centered.

6. A vehicle comprising a chassis; a body; resilient means supporting said body on said chassis; and a linkage connecting at least three spaced points on said body and at least two spaced points on said chassis, said linkage comprising a pair of coaxial first pivots secured to said body; at least one second pivot secured to said chassis and having an axis spaced from that of said first pivots; a first rigid member pivotally connected to said first and second pivots; at least one third pivot secured to said chassis and having an axis spaced from those of said first and second pivots; at least one fourth pivot secured to said body and having an axis spaced from those of said first, second, and third pivots; and a second rigid member pivotally connected to said third and fourth pivots; said first and second rigid members being pivotally connected to each other, and means associated with said resilient means permitting relative movement of said body and chassis only in a direction normal to said body.

7. A vehicle comprising a chassis; a body resiliently supported on said chassis; and a linkage connecting at least three spaced points on said body and at least three spaced points on said chassis, said linkage comprising at least one first pivot secured to said body; at least one second pivot secured to said chassis and having an axis spaced from that of said first pivot; a first rigid member connected to said first and second pivots; at least one third pivot secured to said chassis and having an axis spaced from those of said first and second pivots; at least one fourth pivot secured to said body and having an axis spaced from those of said first, second, and third pivots; and a second rigid member connected to said third and fourth pivots; said first and second rigid members being connected to each other by at least one floating pivot, the number of said floating pivots plus the number of said first, second, third, or fourth pivots each totaling at least three.

8. A vehicle comprising a chassis; a body resiliently supported on said chassis; and a linkage connecting at least three spaced points on said body and at least two spaced points on said chassis, said linkage comprising a pair of coaxial first pivots secured to said body; at least one second pivot secured to said chassis; a first rigid member pivotally connected to said first and second pivots and slidable with respect to one of them; at least one third pivot secured to said chassis; at least one fourth pivot secured to said body; a second rigid member pivotally connected to said third and fourth pivots and slidable with respect to one of them; said first and second rigid members being pivotally and slidably connected to each other; and resilient means connecting said rigid members to the one of said body and chassis which supports the pivots with respect to which said rigid members are slidable, said resilient means being arranged to bias said rigid members into a centered position.

References Cited in the file of this patent
UNITED STATES PATENTS

| | | |
|---|---|---|
| 1,495,171 | Fraser | May 27, 1924 |
| 2,201,912 | Morgan | May 21, 1940 |